United States Patent
Cross, Jr. et al.

(10) Patent No.: US 8,032,825 B2
(45) Date of Patent: Oct. 4, 2011

(54) DYNAMICALLY CREATING MULTIMODAL MARKUP DOCUMENTS

(75) Inventors: Charles W. Cross, Jr., Wellington, FL (US); Michael C. Hollinger, Memphis, TN (US); Igor R. Jablokov, Charlotte, NC (US); Benjamin D. Lewis, Ann Arbor, MI (US); Hilary A. Pike, Austin, TX (US); Daniel M. Smith, Raleigh, NC (US); David W. Wintermute, Boynton Beach, FL (US); Michael A. Zaitzeff, Carson City, NV (US)

(73) Assignee: International Business Machines Corporation, Armonk, NY (US)

( * ) Notice: Subject to any disclaimer, the term of this patent is extended or adjusted under 35 U.S.C. 154(b) by 1697 days.

(21) Appl. No.: 11/154,896

(22) Filed: Jun. 16, 2005

(65) Prior Publication Data

US 2006/0288328 A1 Dec. 21, 2006

(51) Int. Cl.
*G06N 3/00* (2006.01)
(52) U.S. Cl. ........................................ 715/234
(58) Field of Classification Search .................. 715/513, 715/517, 523, 530, 234, 243, 255
See application file for complete search history.

(56) References Cited

U.S. PATENT DOCUMENTS

| | | | |
|---|---|---|---|
| 2002/0184610 A1* | 12/2002 | Chong et al. | 717/109 |
| 2003/0217161 A1* | 11/2003 | Balasuriya | 709/229 |
| 2004/0153323 A1 | 8/2004 | Charney et al. | |
| 2004/0236574 A1 | 11/2004 | Ativanichayaphong | |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0261908 A1 | 11/2005 | Cross | |
| 2005/0283367 A1 | 12/2005 | Ativanichayaphong et al. | |
| 2006/0047510 A1 | 3/2006 | Ativanichayaphong et al. | |
| 2006/0064302 A1 | 3/2006 | Ativanichayaphong et al. | |
| 2006/0074680 A1 | 4/2006 | Cross | |
| 2006/0111906 A1 | 5/2006 | Cross | |
| 2006/0122836 A1 | 6/2006 | Cross | |
| 2006/0136222 A1 | 6/2006 | Cross | |
| 2006/0184626 A1 | 8/2006 | Agapi | |
| 2006/0190264 A1 | 8/2006 | Jaramillo | |

(Continued)

FOREIGN PATENT DOCUMENTS

GB 0507148.5 4/2005

OTHER PUBLICATIONS

U.S. Appl. No. 10/924,520, filed Aug. 24, 2004, Charles W. Cross.

(Continued)

*Primary Examiner* — Kyle R Stork
(74) *Attorney, Agent, or Firm* — DeLizio Gilliam, PLLC (57) ABSTRACT

Methods, systems, and products for dynamically creating a multimodal markup document are provided that include selecting a multimodal markup template, identifying in dependence upon the multimodal markup template a dynamic content module, instantiating the dynamic content module, executing a dynamic content creation function in the instantiated dynamic content module, receiving dynamic content from the dynamic content creation function, and including the dynamic content in the multimodal markup template. Selecting a multimodal markup template may be carried out by identifying a multimodal markup template from URI encoded data embedded in a request for a multimodal markup document from a multimodal browser. The multimodal markup template may include static content and the dynamic content may include XHTML+Voice content.

17 Claims, 6 Drawing Sheets

U.S. PATENT DOCUMENTS

| | | |
|---|---|---|
| 2006/0224430 A1 | 10/2006 | Butt |
| 2006/0229880 A1 | 10/2006 | White |
| 2006/0235694 A1 | 10/2006 | Cross |
| 2008/0177611 A1 | 7/2008 | Sommers et al. |
| 2009/0094233 A1 | 4/2009 | Marvit et al. |
| 2009/0204465 A1 | 8/2009 | Pradhan |
| 2009/0234921 A1 | 9/2009 | Dudley |
| 2009/0287685 A1 | 11/2009 | Charnock et al. |

OTHER PUBLICATIONS

U.S. Appl. No. 10/945,112, filed Sep. 20, 2004, Charles W. Cross.
U.S. Appl. No. 10/870,517, filed Jun. 17, 2004, Charles W. Cross.
U.S. Appl. No. 10/441,839, filed May 20, 2003, Soonthom Ativanichayaphong.
U.S. Appl. No. 11/062,731, filed Feb. 22, 2005, David Jaramillo.
U.S. Appl. No. 11/007,830, filed Dec. 8, 2004, Charles W. Cross.
U.S. Appl. No. 10/945,119, filed Sep. 20, 2004, Charles W. Cross.
U.S. Appl. No. 11/022,464, filed Dec. 22, 2004, Charles W. Cross.
U.S. Appl. No. 10/741,997, filed Dec. 19, 2003, Akram Boughannam.
U.S. Appl. No. 10/741,499, filed Dec. 19, 2003, Akram Boughannam.
U.S. Appl. No. 11/056,493, filed Feb. 11, 2005, Ciprian Agapi.
U.S. Appl. No. 11/093,545, filed Mar. 30, 2005, Marc White.
U.S. Appl. No. 11/105,865, filed Apr. 14, 2005, Charles W. Cross.
U.S. Appl. No. 10/849,642, filed May 19, 2004, Charles W. Cross.
U.S. Appl. No. 10/992,979, filed Nov. 19, 2004, Charles W. Cross.
U.S. Appl. No. 10/733,610, filed Dec. 11, 2003, Charles W. Cross.
Final Office Action, U.S. Appl. No. 11/154,896, May 14, 2008.
Final Office Action, U.S. Appl. No. 11/154,899, Jun. 23, 2009.
Office Action, U.S. Appl. No. 12/109,227, Dec. 10, 2010.

* cited by examiner

DYNAMICALLY CREATING MULTIMODAL MARKUP DOCUMENTS

BACKGROUND OF THE INVENTION

1. Field of the Invention

The field of the invention is data processing, or, more specifically, methods, systems, and products for displaying available menu choices in a multimodal browser.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through other modes, such as multimodal access. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications often run on servers that serve up multimodal web pages for display on a multimodal browser. A 'multimodal browser,' as the term is used in this specification, generally means a web browser capable of receiving multimodal input and interacting with users with multimodal output. Multimodal browsers typically render web pages written in XHTML+Voice (X+V).

X+V provides a markup language that enables users to interact with an multimodal application often running on a server through spoken dialog in addition to traditional means of input such as keyboard strokes and mouse pointer action. X+V adds spoken interaction to standard web content by integrating XHTML (eXtensible Hypertext Markup Language) and speech recognition vocabularies supported by Voice XML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

JavaServer Pages (JSP) currently provides a platform-independent, server-side technology for dynamically generating XML and HTML content. Current JSP technologies have not been applied to the creation of multimodal web pages however. The additional speech input and output modes of X+V applications require additional interactions between data and visual elements resulting in a more complex structure than that of the typical XML or HTML page. There is therefore an ongoing need for dynamically creating multimodal markup documents.

SUMMARY OF THE INVENTION

Methods, systems, and products for dynamically creating a multimodal markup document are provided that include selecting a multimodal markup template, identifying in dependence upon the multimodal markup template a dynamic content module, instantiating the dynamic content module, executing a dynamic content creation function in the instantiated dynamic content module, receiving dynamic content from the dynamic content creation function, and including the dynamic content in the multimodal markup template. Selecting a multimodal markup template may be carried out by identifying a multimodal markup template from URI encoded data embedded in a request for a multimodal markup document from a multimodal browser. The multimodal markup template may include static content and the dynamic content may include XHTML+Voice content.

Embodiments may also include sending the multimodal markup template including the dynamic content to a multimodal browser in a response message. Embodiments may also include creating a dynamic content module and creating a multimodal markup template.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for displaying available menu choices in a multimodal browser. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Dynamically Creating Multimodal Markup Documents

Figure 1:
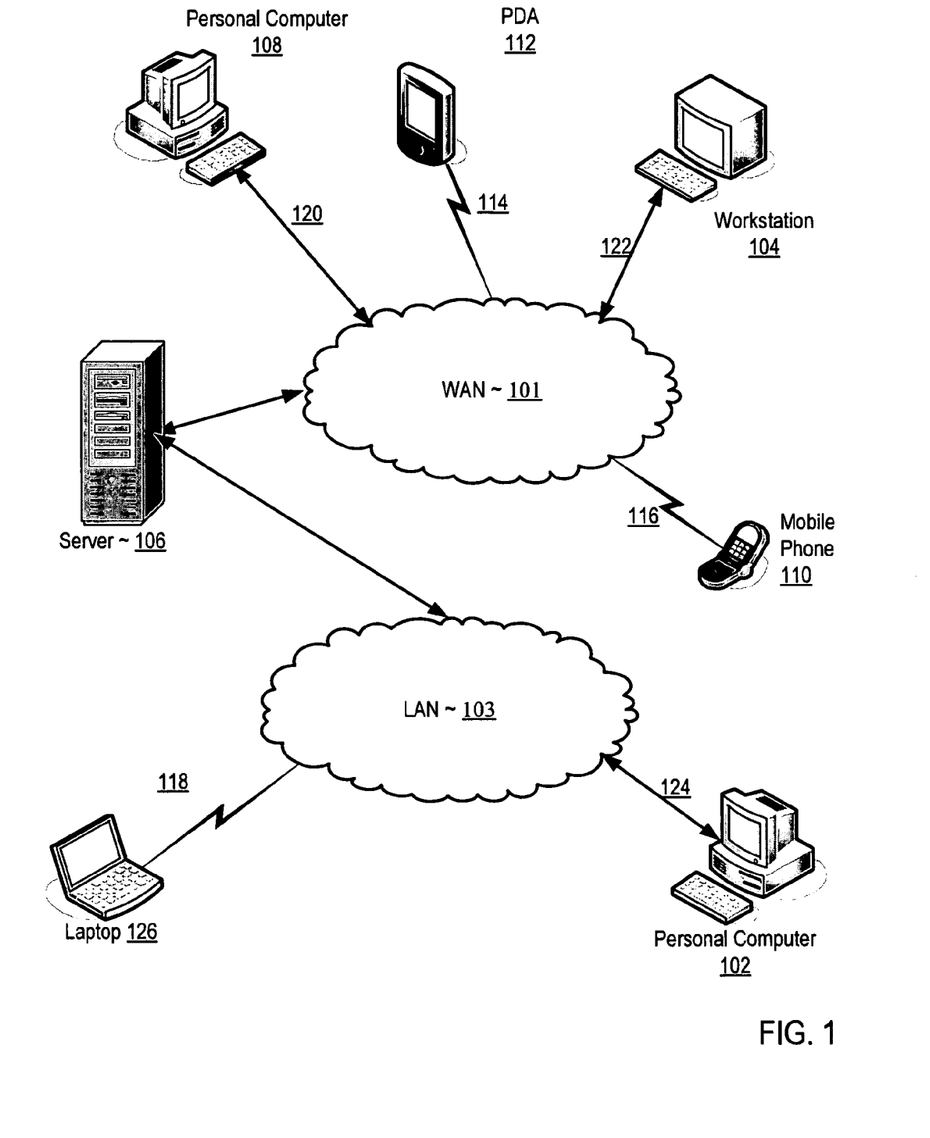
FIG. 1 sets forth a network diagram illustrating an exemplary system of servers and client devices.

Exemplary methods, systems, and products for dynamically creating a multimodal markup document according to embodiments of the present invention are described with reference to the accompanying drawings, beginning with FIG. 1. FIG. 1 sets forth a network diagram illustrating an exemplary system of servers and client devices each of which is capable of supporting a multimodal application such as multimodal web applications and multimodal web browsers in accordance with the present invention. The system of FIG. 1 includes a number of computers connected for data communications in networks.

The data processing system of FIG. 1 includes wide area network ("WAN") (101) and local area network ("LAN") (103). The network connection aspect of the architecture of FIG. 1 is only for explanation, not for limitation. In fact, systems having multimodal applications according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, server (106) implements a gateway, router, or bridge between LAN (103) and WAN (101). Server (106) may be any computer capable of accepting a request for a resource from a client device and responding by providing a resource to the requester. One example of such a server is an HTTP ('HyperText Transport Protocol') server or 'web server.' The exemplary server (106) is capable of serving up multimodal markup documents dynamically created in accordance with the present invention. Such dynamically multimodal markup documents are created by selecting a multimodal markup template, identifying in dependence upon the multimodal markup template a dynamic content module, instantiating the dynamic content module, executing a dynamic content creation function in the instantiated dynamic content module, receiving dynamic content from the dynamic content creation function, and including the dynamic content in the multimodal markup template.

As discussed in more detail below, multimodal markup document is a markup document for multimodal interaction with a user. A multimodal markup document typically includes a visual markup and voice markup. X+V is one example of a multimodal markup language useful in implementing embodiments of the present invention. For visual markup, X+V includes the XHTML standard. For voice markup, X+V includes a subset of VoiceXML. A multimodal markup template is a multimodal document including identifications to dynamic content modules capable of creating dynamic content for insertion in the template. A dynamic content module is a software component capable of dynamically creating content for inclusion in the multimodal markup template.

In the example of FIG. 1, several exemplary client devices including a PDA (112), a computer workstation (104), a mobile phone (110), and a personal computer (108) are connected to a WAN (101). Network-enabled mobile phone (110) connects to the WAN (101) through a wireless link (116), and the PDA (112) connects to the network (101) through a wireless link (114). In the example of FIG. 1, the personal computer (108) connects through a wireline connection (120) to the WAN (101) and the computer workstation (104) connects through a wireline connection (122) to the WAN (101). In the example of FIG. 1, the laptop (126) connects through a wireless link (118) to the LAN (103) and the personal computer (102) connects through a wireline connection (124) to LAN (103).

Each of the exemplary client devices (108, 112, 104, 110, 126, and 102) are capable of supporting a multimodal browser coupled for data communications with a multimodal web application on the server (106) and are capable displaying multimodal markup documents dynamically created according to embodiments of the present invention. A 'multimodal browser,' as the term is used in this specification, generally means a web browser capable of receiving multimodal input and interacting with users with multimodal output. Multimodal browsers typically render web pages written in XHTML+Voice (X+V).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Multimodal applications that support dynamically creating a multimodal markup document according to embodiments of the present invention are generally implemented with computers, that is, with automated computing machinery. For further explanation, therefore, FIG. 2 sets forth a block diagram of automated computing machinery comprising an exemplary server (151) capable of supporting a web application capable of dynamically creating a multimodal markup document according to embodiments of the present invention.

Figure 2:
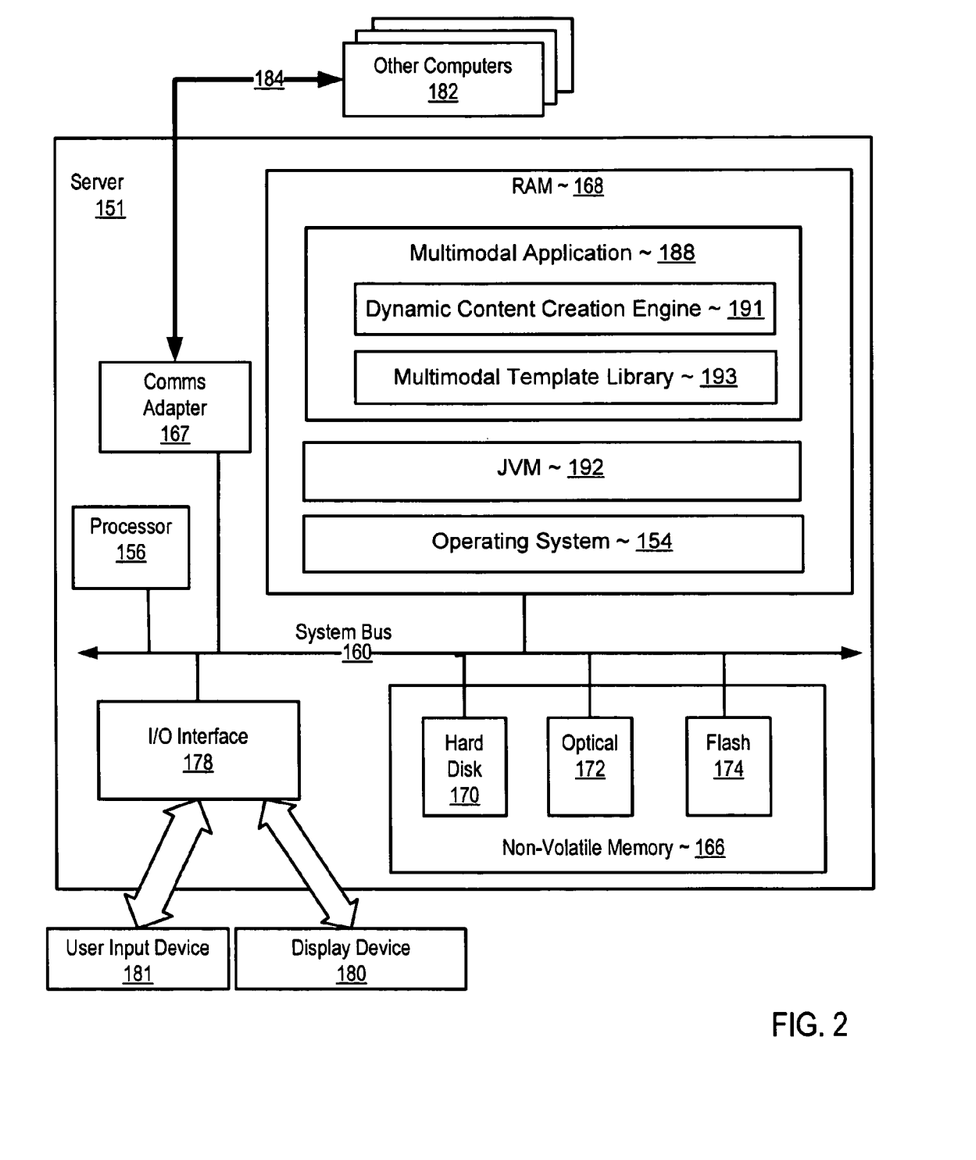
FIG. 2 sets forth a block diagram of automated computing machinery comprising an exemplary server capable of supporting a web application capable of dynamically creating a multimodal markup document.

The server (151) of FIG. 2 includes at least one computer processor (156) or 'CPU' as well as random access memory (168) ("RAM") which is connected through a system bus (160) to processor (156) and to other components of the computer. Stored in RAM (168) is an operating system (154). Operating systems useful in computers according to embodiments of the present invention include UNIX™, Linux™, Microsoft NT™, AIX™, IBM's i5/OS, and many others as will occur to those of skill in the art.

Also stored in RAM (168) is a multimodal application (188) comprising a dynamic content creation engine (191) capable of dynamically creating a multimodal markup document by selecting, from the multimodal template library (193) a multimodal markup template; identifying in dependence upon the multimodal markup template a dynamic content module; instantiating the dynamic content module;

executing a dynamic content creation function in the instantiated dynamic content module; receiving dynamic content from the dynamic content creation function; and including the dynamic content in the multimodal markup template.

As discussed below, a multimodal markup template may be implemented as a Java Server Pages ('JSP') page and a dynamic content module may be implemented as a Java Bean. The exemplary a multimodal application (188) therefore is illustrated as running on a Java Virtual Machine ('JVM') (192) providing a runtime framework for use of JSPs and Java Beans.

Server (151) of FIG. 2 includes non-volatile computer memory (166) coupled through a system bus (160) to processor (156) and to other components of the server (151). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary server (151) of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary server (151) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal applications according to embodiments of the present invention include modems for wired dial-up communications, Ethernet (IEEE 802.3) adapters for wired network communications, and 802.11b adapters for wireless network communications.

Multimodal markup documents that are dynamically created according to embodiments of the present invention are generally displayed on multimodal web browsers installed on automated computing machinery. For further explanation, therefore, FIG. 3 sets forth a block diagram of automated computing machinery comprising an exemplary client (152) that supports a multimodal browser useful in displaying dynamically created multimodal markup documents.

Figure 3:
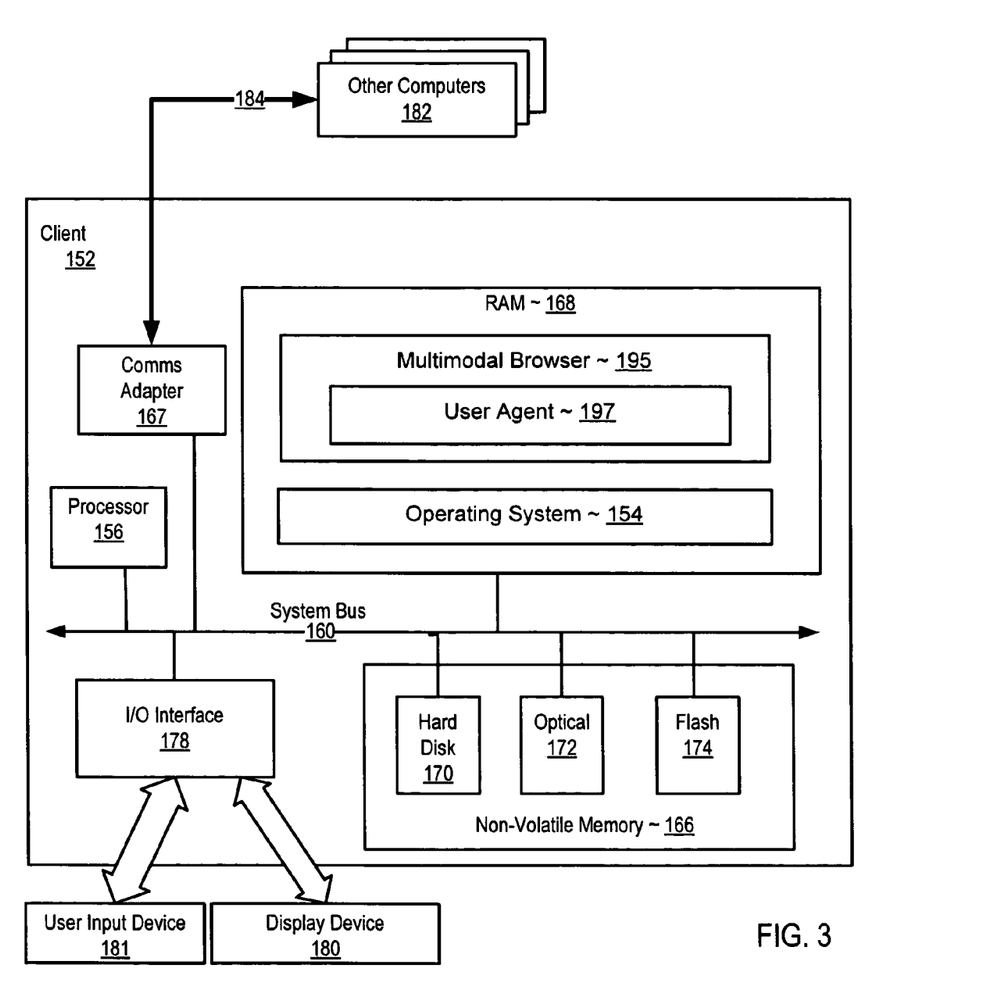
FIG. 3 sets forth a block diagram of automated computing machinery comprising an exemplary client that supports a multimodal browser useful in displaying dynamically created multimodal markup document.

The client (152) of FIG. 3 includes at least one computer processor (156) or 'CPU' as well as random access memory (168) ("RAM") which is connected through a system bus (160) to processor (156) and to other components of the computer. Stored in RAM (168) is an operating system (154). Operating systems useful in computers according to embodiments of the present invention include UNIX™, Linux™, Microsoft NT™, AIX™, IBM's i5/OS, and many others as will occur to those of skill in the art.

Also stored in RAM (168) is a multimodal browser (195) capable of displaying multimodal markup documents dynamically created according to embodiments of the present invention. The exemplary multimodal browser (195) of FIG. 3 also includes a user agent (197) capable of receiving from a user speech and converting the speech to text by parsing the received speech against a grammar. A grammar is a set of words or phrases that the user agent will recognize. Typically each dialog defined by a particular form or menu being presented to a user has one or more grammars associated with the form or menu. Such grammars are active only when the user is in that dialog.

Client (152) of FIG. 3 includes non-volatile computer memory (166) coupled through a system bus (160) to processor (156) and to other components of the client (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary client of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary client (152) of FIG. 3 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in multimodal browsers according to embodiments of the present invention include modems for wired dial-up communications, Ethernet (IEEE 802.3) adapters for wired network communications, and 802.11b adapters for wireless network communications.

Figure 4:
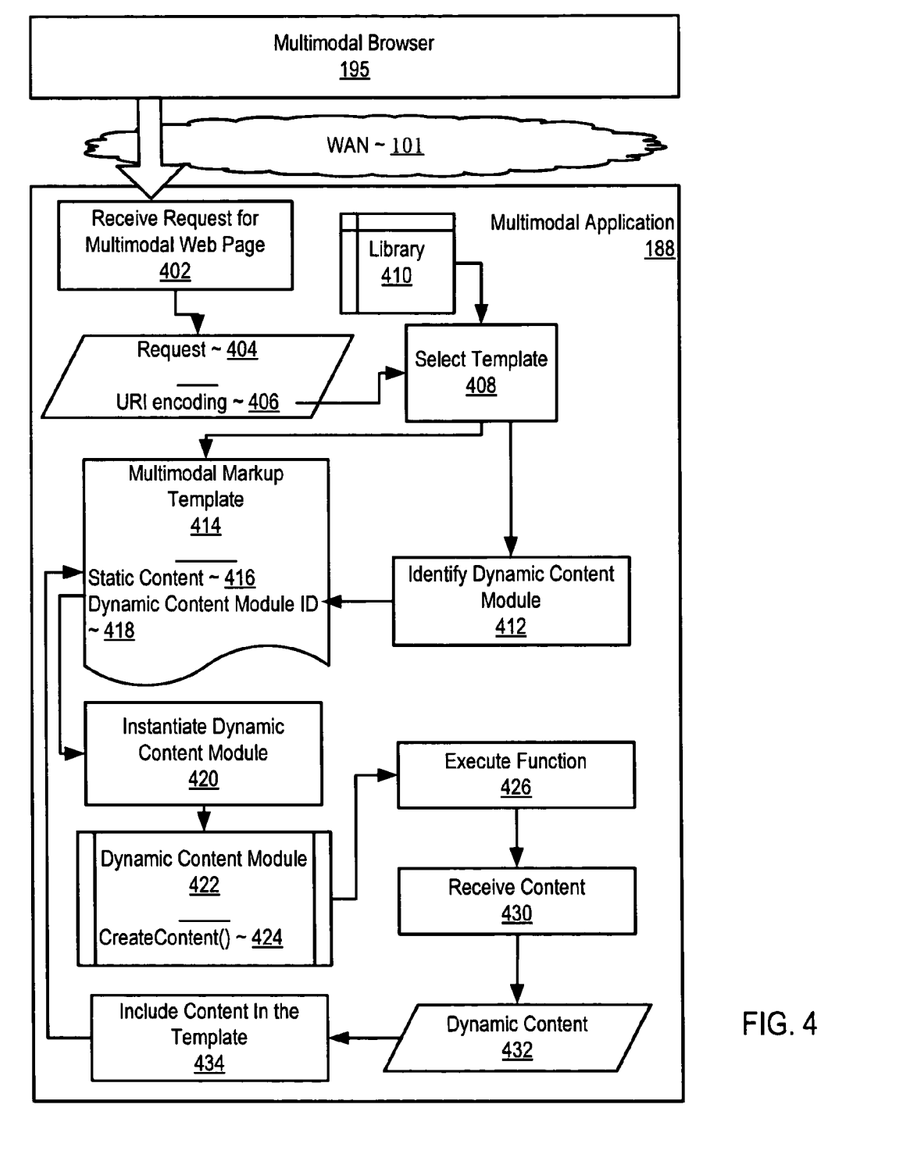
FIG. 4 sets forth a flow chart illustrating an exemplary method for dynamically creating a multimodal markup document.

For further explanation, FIG. 4 sets forth a flow chart illustrating an exemplary method for dynamically creating a multimodal markup document. As discussed above, a multimodal markup document is a markup document capable of display in a multimodal browser that includes markup for interacting with a user through multimodal access. A multimodal markup document typically includes a visual markup and voice markup. X+V is one example of a multimodal markup language useful in implementing embodiments of the present invention. For visual markup, X+V includes the XHTML standard. For voice markup, X+V includes a subset of VoiceXML.

The method of FIG. 4 includes selecting (408) a multimodal markup template (414). A multimodal markup template is a multimodal document including identifications to dynamic content modules capable of creating dynamic content for insertion in the template. In the example of FIG. 4 the multimodal markup template (414) also includes static content (416). Including static content in the multimodal markup template advantageously reduces the time necessary to dynamically create a multimodal web page using the multimodal markup template because the static content is not required to be created dynamically thereby reducing the overall quantity of content created dynamically.

A multimodal markup template according to embodiments of the present invention may be implemented as a Java Server Pages page. Java Server Pages provides a technology for dynamically creating markup documents. A JSP page is a markup document that contains additional bits of Java code that execute application logic to generate dynamic content. The Java code is typically identified by markup tags within the JSP page. JSP pages are often compiled into servlets that generate dynamic content for inclusion in the JSP page. 'Servlets' are programs written in the Java programming language that run on a server, as opposed to a browser, where Java programs running in browsers are referred to as 'applets.' The Java code is typically extracted from the JSP page and the dynamic content is inserted in the Java code's place. Detailed information about servlets can be found at http://java.sun.com/progucts/servlet. Detailed information about JSPs can be found at http://java.sun.com/products/jsp/. 'Java,' 'Java Server Pages,' and 'JSP' are trademarks of Sun Microsystems, Inc.

In the example of FIG. 4, selecting (408) a multimodal markup template (414) is carried out by identifying a multimodal markup template from URI encoded data (406) embedded in a request (404) for a multimodal markup document from a multimodal browser (195). In the example of FIG. 4, a multimodal application (188) retrieves the URI encoded data (406) from the request (404) and retrieves a multimodal markup template (414) from a library (410) of multimodal markup templates.

The method of FIG. 4 includes identifying (412) in dependence upon the multimodal markup template (414) a dynamic content module (418). Identifying (412) a dynamic content module (418) may be carried out by searching the multimodal markup template for tags identifying a segment of code that identifies dynamic content module (418).

A dynamic content module is a software component capable of dynamically creating content for inclusion in the multimodal markup template. A dynamic content module may be implemented as a Java Bean. A Java Bean is a reusable Java software component that may be designed to create dynamic multimodal content and may be called from a JSP page. Such a Java Bean may be called from a JSP page through the use of the following line of XML.

<jsp:    useBean    id="SomeBean" class="DynamicConentCreation.SomeBean"

The line above of instantiates the bean "DynamicConentCreation.SomeBean" as SomeBean.

The method of FIG. 4 also includes instantiating (420) the dynamic content module (422) and executing (426) a dynamic content creation function (424) in the instantiated dynamic content module (422). Executing a dynamic content creation function in the method of FIG. 4 results in the dynamic creation of multimodal content. As discussed above, XHTML+Voice content is one form of such multimodal content that may be dynamically created in accordance with the present invention.

Instantiating (420) the dynamic content module (422) and executing (426) a dynamic content creation function (424) may implemented by instantiating a Java Bean and calling a content creation function within the Java Bean. Continuing with the example above, consider the following lines within a JSP page.

<jsp:    useBean    id="SomeBean" class="DynamicConentCreation.SomeBean"
<%    SomeBean.GetDynamicConent(SomeParameter, SomeOtherParameter %>

The first of the two exemplary lines in the JSP above instantiates the bean "DynamicConentCreation.SomeBean" as SomeBean. The second line calls a dynamic content creation function called getDynamicConent parameterized with SomeParameter, and SomeOtherParameter. The exemplary dynamic content creation function returns dynamic multimodal content for inclusion in the multimodal markup template.

The method of FIG. 4 also includes receiving (430) dynamic content (432) from the dynamic content creation function (424) and including (434) the dynamic content (432) in the multimodal markup template (414). Including the dynamic content in the multimodal markup template often includes removing tags identifying the dynamic content creation module and inserting in the place of the tags the dynamically created content.

The method of FIG. 4 also includes sending the multimodal markup template including the dynamic content to a multimodal browser in a response message. The multimodal markup template including the dynamic content may be displayed in a multimodal browser without a user ever knowing or caring how the displayed content is created. That is, the dynamic creation of the multimodal content may occur completely transparently to a user.

Figure 5:
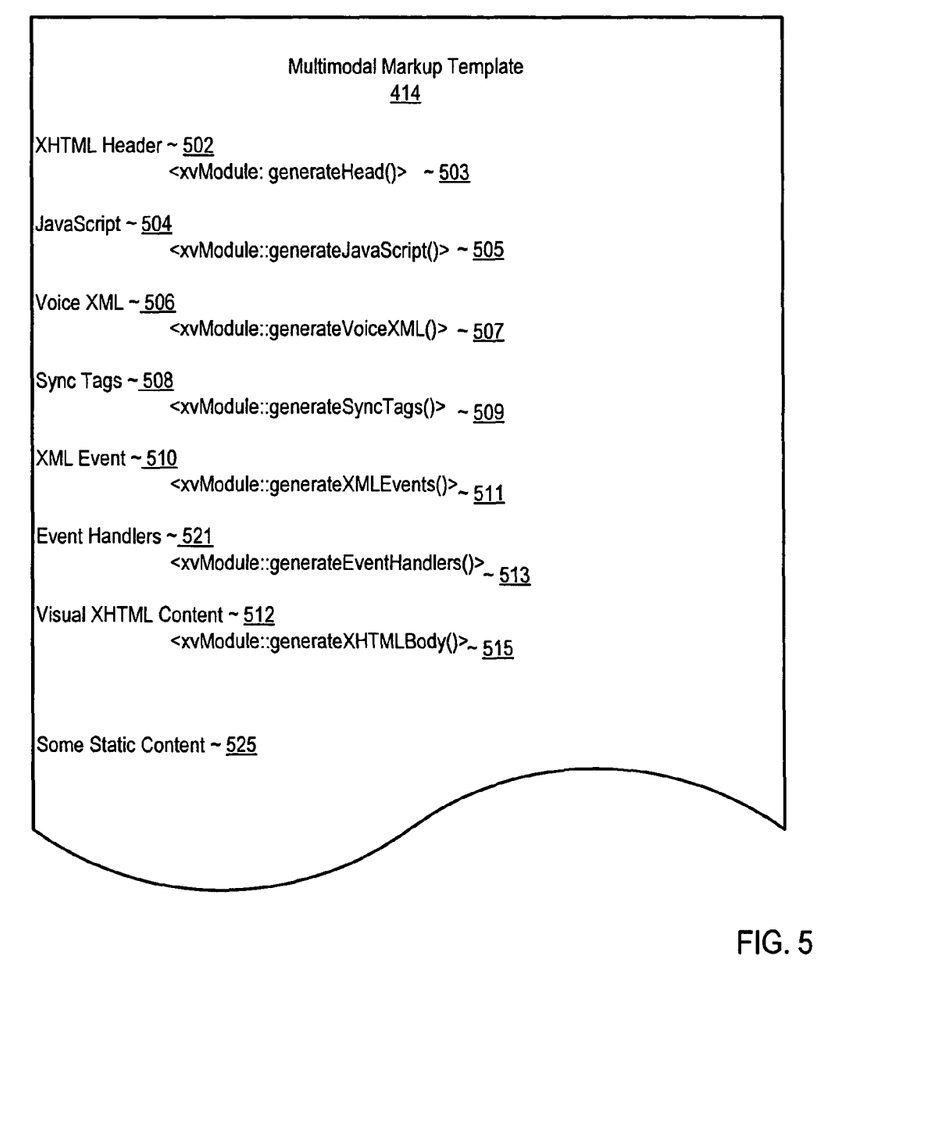
FIG. 5 sets forth a line drawing of an exemplary multimodal markup template useful in dynamically creating a multimodal markup documents.

For further explanation, FIG. 5 sets forth a line drawing of an exemplary multimodal markup template useful in dynamically creating a multimodal markup documents according to embodiments of the present invention. The exemplary multimodal markup template (414) of FIG. 5 includes an identification of an xvModule for creating an XHTML header having a content creation function generateHead( ) (503) that when executed dynamic creates an XHTML header (502) and inserts the dyncaically created header within the multimodal markup template (414).

The exemplary multimodal markup template (414) of FIG. 5 also includes an identification of an xvModule for creating an JavaScript having a content creation function generateJavaScript( ) (507) that when executed dynamic creates JavaScript (504) for inclusion in the multimodal markup template (414). JavaScript is an object-oriented scripting language used in many websites. A script typically includes a list of commands that can be executed without user interaction and a scripting language such as JavaScript is a simple programming language for writing such scripts.

The exemplary multimodal markup template (414) of FIG. 5 also includes an identification of an xvModule for creating VoiceXML having a content creation function generateVoiceXML( ) (507) that when executed dynamic creates one or more Voice XML dialogs (506) for inclusion within the multimodal markup template (414). There are two kinds of dialogs in Voice XML: forms and menus. Voice forms define an interaction that collects values for a set of form item variables. Each form item variable of a voice form may specify a grammar that defines the allowable inputs for that form item. If a form-level grammar is present, it can be used to fill several form items from one utterance. A menu presents the user with a choice of options and then transitions to another dialog based on that choice.

Forms are interpreted by a form interpretation algorithm (FIA). An FIA typically includes a main loop that repeatedly selects form items collects, user input, and identifies any actions to be taken in response to input items. Interpreting a voice form item typically includes selecting and playing one or more voice prompts, collecting user input, either a response that fills in one or more input items, or a throwing of some event (a help even, for example), and interpreting any actions that pertained to the newly filled in input items.

The exemplary multimodal markup template (414) of FIG. 5 also includes an identification of an xvModule for creating X+V Sync tags having a content creation function generateSyncTags( ) (509) that when executed dynamic creates one or more X+V sync tags (508) for inclusion within the multimodal markup template (414). To synchronize the receipt of spoken information and visual tags, X+V provides a <sync> tag. The <sync> tag synchronizes data entered through various multimodal input. That is, the <sync> tag synchronizes accepted speech commands received in the multimodal browser with visual tags displayed in the multimodal browser. <Sync> synchronizes the value property of an XHTML input control with a VoiceXML field in a one to one manner.

The exemplary multimodal markup template (414) of FIG. 5 also includes an identification of an xvModule for creating XML Events having a content creation function generateXMLEvents ( ) (511) that when executed dynamic creates one or more XML events (510) for inclusion within the multimodal markup template (414). An XML event is the representation of some asynchronous occurrence, such as a mouse click on a GUI display, or an arithmetical error in the value of an attribute of the element, or any other occurrence. An XML event is targeted at an associated XML element in an XML document.

The exemplary multimodal markup template (414) of FIG. 5 also includes an identification of an xvModule for creating XML event handlers having a content creation function generateXMLEventHandlers ( ) (513) that when executed dynamic creates one or more XML event handlers (521) for inclusion within the multimodal markup template (414). As discussed above, an XML event is the representation of some asynchronous occurrence, such as a mouse click on a GUI display. An event handler is a function for executing an action in response to the event.

The exemplary multimodal markup template (414) of FIG. 5 also includes an identification of an xvModule for creating Visual XHTML content having a content creation function generateXHMLBody ( ) (515) that when executed dynamic creates XHTML conent (512) for inclusion within the multimodal markup template (414). As discussed above, an XHTML provides the visual markup for the multimodal markup language X+V.

The exemplary multimodal markup template (414) of FIG. 5 also includes static content (525). Static content advantageously provides content in the multimodal markup template that is not dynamically created and therefore reduces overall processing necessary to dynamically create a multimodal markup document from the multimodal markup template of FIG. 5.

As discussed above, dynamic multimodal content is created according to embodiments of the present invention by calling content creation functions in dynamic content modules designed to produce specific multimodal content. For further explanation, FIG. 6 sets forth an exemplary flow chart illustrating a method for creating dynamic content creation modules and multimodal markup templates in accordance with the present invention.

Figure 6:
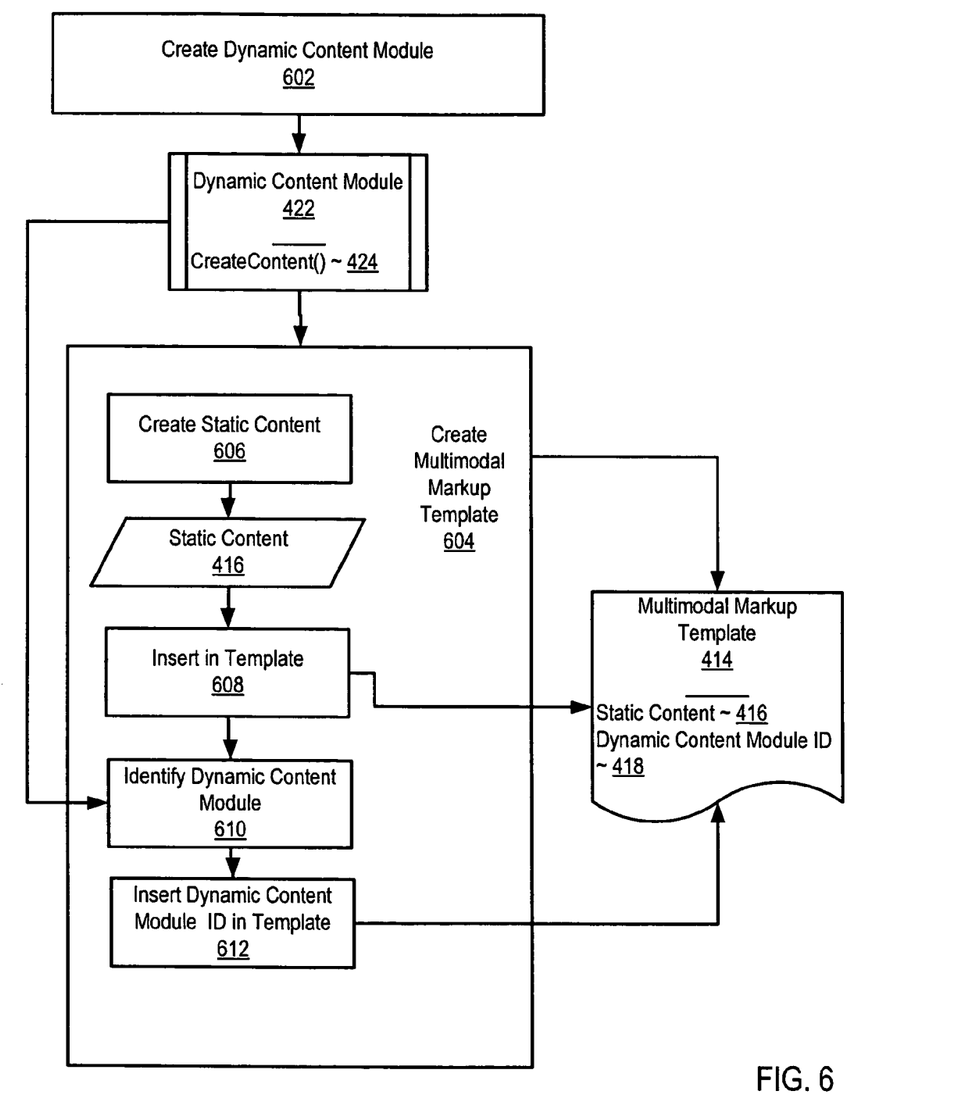
FIG. 6 sets forth an exemplary flow chart illustrating a method for creating dynamic content creation modules and multimodal markup templates.

The method of FIG. 6 includes creating (602) a dynamic content module (422). As discussed above, a dynamic content module may be implemented a Java Bean. Creating (602) a dynamic content module (422) may therefore be carried out by creating a Java Bean designed to dynamically create multimodal content. Such Java Beans may be created with an authoring tool such as for example the JavaBeans Development Kit ('BDK'). The BDK provides a reference Bean container, and reusable example source code for use by bean developers.

The method of FIG. 6 includes creating (604) a multimodal markup template (414). As discussed above, a multimodal markup template may be implemented as a JSP page. Creating (604) a multimodal markup template (414) may be carried out through the use of an authoring tool such as for example Java Web Services Developer Pack 1. The Java Web Services Developer Pack is an integrated toolkit that allows Java developers to build and test markup documents, Web services, and Web applications.

Creating (604) a multimodal markup template (414) according to the method of FIG. 6 is typically carried out by creating (606) static content (416) and inserting (608) the static content (416) in the multimodal markup template. Static content advantageously provides content in the multimodal markup template that is not dynamically created and therefore reduces overall processing necessary to dynamically create a multimodal markup document from the multimodal markup template of FIG. 5.

Creating (604) a multimodal markup template (414) according to the method of FIG. 6 is also carried out by identifying (610) a dynamic content module (610) and inserting (612) a dynamic content module ID (418) in the multimodal markup template (414). As discussed above, a dynamic content module may be implemented as a Java Bean and called from a JSP page through the use an identification in the JSP such as:
<jsp: useBean id="SomeBean" class="DynamicConentCreation.SomeBean"
for instantiating the bean "DynamicConentCreation.SomeBean" as SomeBean.

Dynamically creating a multimodal markup document according to embodiments of the present invention provides a number of advantages among others. Such advantages include:
  Template libraries may offload visual aspects of the dynamic content to easily maintainable external files.
  A web master can modify the appearance of the templates by simply editing the XHTML content of templates, without requiring the programming knowledge to modify dynamic content modules.
  Dynamic content modules according to embodiments of the present invention may be highly modularized within a tool.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically creating a multimodal markup document, the method comprising:
  selecting a multimodal markup template, the multimodal markup template comprising visual markup and voice markup, the visual markup and voice markup operating to synchronize voice interactions specified by the voice markup and visual interactions specified by the visual markup, the multimodal markup template comprising identifications to dynamic content modules capable of creating dynamic content for insertion in the template;
  identifying in dependence upon the multimodal markup template a dynamic content module;
  instantiating the dynamic content module;
  executing a dynamic content creation function in the instantiated dynamic content module;
  receiving dynamic content from the dynamic content creation function; and
  including the dynamic content in the multimodal markup template.

2. The method of claim 1 wherein selecting a multimodal markup template further comprises identifying a multimodal markup template from URI encoded data embedded in a request for a multimodal markup document from a multimodal browser.

3. The method of claim 1 wherein the multimodal markup template further comprises static content.

4. The method of claim 1 wherein the dynamic content further comprises XHTML+Voice content.

5. The method of claim 1 further comprising sending the multimodal markup template including the dynamic content to a multimodal browser in a response message.

6. The method of claim 1 further comprising creating a dynamic content module.

7. The method of claim 1 further comprising creating a multimodal markup template.

8. A system of dynamically creating a multimodal markup document, the system comprising:
 a computer processor;
 a computer memory coupled for data transfer to the processor, the computer memory having disposed within it computer program instructions comprising:
 a dynamic content creation engine capable of:
 selecting a multimodal markup template, the multimodal markup template comprising visual markup and voice markup, the visual markup and voice markup operating to synchronize voice interactions specified by the voice markup and visual interactions specified by the visual markup, the multimodal markup template comprising identifications to dynamic content modules capable of creating dynamic content for insertion in the template;
 identifying in dependence upon the multimodal markup template a dynamic content module;
 instantiating the dynamic content module;
 executing a dynamic content creation function in the instantiated dynamic content module;
 receiving dynamic content from the dynamic content creation function; and
 including the dynamic content in the multimodal markup template.

9. The system of claim 8 wherein the dynamic content creation engine further comprises computer program instructions capable of identifying a multimodal markup template from URI encoded data embedded in a request for a multimodal markup document from a multimodal browser.

10. The system of claim 8 wherein the multimodal markup template further comprises static content.

11. The system of claim 8 wherein the dynamic content further comprises XHTML+Voice content.

12. The system of claim 8 further comprising computer program instructions capable of sending the multimodal markup template including the dynamic content to a multimodal browser in a response message.

13. A computer program product of dynamically creating a multimodal markup document, the computer program product disposed upon a recording medium, the computer program product comprising:
 computer program instructions that select a multimodal markup template, the multimodal markup template comprising visual markup and voice markup, the visual markup and voice markup operating to synchronize voice interactions specified by the voice markup and visual interactions specified by the visual markup, the multimodal markup template comprising identifications to dynamic content modules capable of creating dynamic content for insertion in the template;
 computer program instructions that identify in dependence upon the multimodal markup template a dynamic content module;
 computer program instructions that instantiate the dynamic content module;
 computer program instructions that execute a dynamic content creation function in the instantiated dynamic content module;
 computer program instructions that receive dynamic content from the dynamic content creation function; and
 computer program instructions that include the dynamic content in the multimodal markup template.

14. The computer program product of claim 13 wherein computer program instructions that select a multimodal markup template further comprise computer program instructions that identify a multimodal markup template from URI encoded data embedded in a request for a multimodal markup document from a multimodal browser.

15. The computer program product of claim 13 wherein the multimodal markup template further comprises static content.

16. The computer program product of claim 13 wherein the dynamic content further comprises XHTML+Voice content.

17. The computer program product of claim 13 further comprising computer program instructions that send the multimodal markup template including the dynamic content to a multimodal browser in a response message.

* * * * *